United States Patent
Konagaya

(10) Patent No.: US 6,960,759 B2
(45) Date of Patent: Nov. 1, 2005

(54) LIGHT SOURCE DEVICE, IMAGE READING APPARATUS AND IMAGE READING METHOD

(75) Inventor: Tatsuya Konagaya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 193 days.

(21) Appl. No.: 09/962,198

(22) Filed: Sep. 26, 2001

(65) Prior Publication Data

US 2002/0056804 A1 May 16, 2002

(30) Foreign Application Priority Data

Sep. 26, 2000 (JP) ............................. 2000-291826

(51) Int. Cl.$^7$ ................................................ H01J 7/24
(52) U.S. Cl. .......................... 250/238; 315/50; 315/117; 362/294
(58) Field of Search ............................ 315/32, 50, 112, 315/117; 313/45, 46, 13; 250/552, 238; 62/3.2; 136/203, 204; 372/34–36; 362/580, 547, 92, 264, 294

(56) References Cited

U.S. PATENT DOCUMENTS

| | | | | |
|---|---|---|---|---|
| 5,438,579 A | * | 8/1995 | Eda et al. ..................... | 372/34 |
| 5,864,145 A | * | 1/1999 | Krimermann et al. . | 250/559.29 |
| 6,027,256 A | * | 2/2000 | Nightingale et al. .......... | 385/92 |
| 6,055,815 A | * | 5/2000 | Peterson ....................... | 62/3.7 |
| 6,356,365 B1 | * | 3/2002 | Oida et al. ................. | 358/475 |
| 6,582,100 B1 | * | 6/2003 | Hochstein et al. .......... | 362/294 |

FOREIGN PATENT DOCUMENTS

JP 7-175035 7/1995 .......... G02F/1/333

* cited by examiner

Primary Examiner—David Porta
Assistant Examiner—Stephen Yam
(74) Attorney, Agent, or Firm—Sughrue Mion, PLLC

(57) ABSTRACT

A light source device which can prevent a large-sized structure of the device, a light source device which can improve assembling efficiency and maintainability of the device, and an image forming method and apparatus in which occurrence of moisture condensation can be prevented, are provided. An LED substrate in which a large number of light emitting diodes (LED) are arranged on the surface thereof in a two-dimensional manner, a base, a Peltier element, and a radiating fin are formed integrally by urging force of a compression spring. The radiating fin is disposed in contact with a light source housing body. Further, in carrying out temperature adjustment control using the Peltier element, the temperature adjustment control is carried out only when the internal temperature of the device in which a light source device is provided, is a predetermined temperature or higher.

25 Claims, 7 Drawing Sheets

F I G. 5
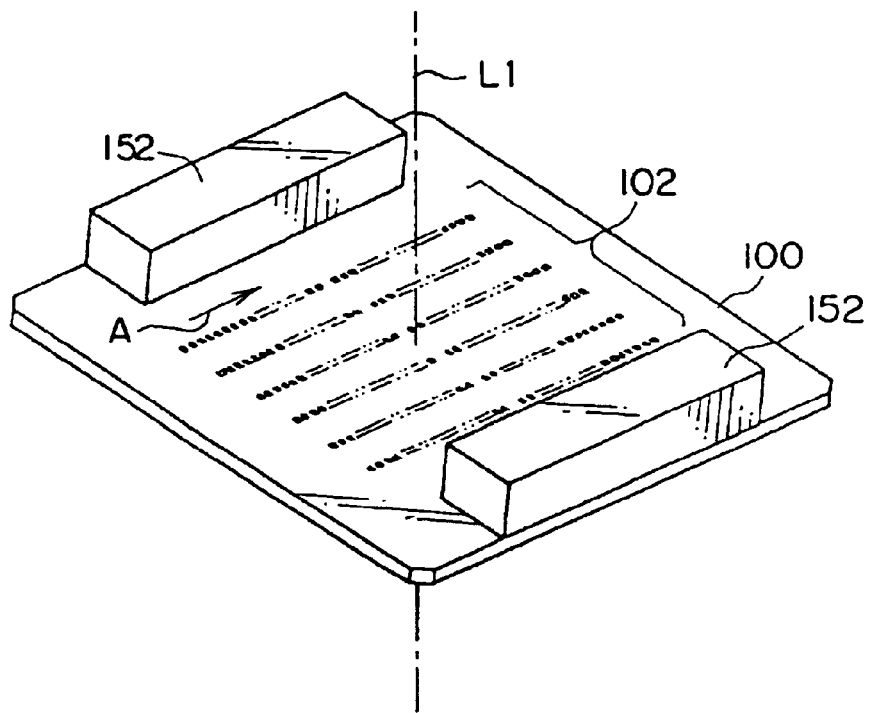

LIGHT SOURCE DEVICE, IMAGE READING APPARATUS AND IMAGE READING METHOD

BACKGROUND OF THE INVENTION

1. Field of the Invention

The present invention relates to a light source device, an image reading apparatus, and an image reading method. In particular, it relates to a light source device which is capable of suppressing change of state of emitted light, resulting from variation of temperature, and an image reading apparatus equipped with the light source device, and also to an image reading method in the image reading apparatus.

2. Description of the Related Art

In recent years, image reading apparatuses have been put to practical use, wherein illuminating light is applied to a reflection original such as a photographic print, or a transmission original such as a photographic film, and reflected light or transmitted light from the original which carries image information to be recorded thereon, is received by an image sensor such as a charge coupled device (CCD) so as to allow reading of an image recorded on the original, and various corrections are made for image data obtained by the reading, and thereafter, the image is recorded on a recording material such as photographic printing paper, or the image is shown on a display. Such image reading apparatuses have an advantage in that automation of an operation from reading of an image recorded on an original to recording of the image on a recording material or displaying of the image on a display is facilitated.

In this kind of image reading apparatus, a white light source such as a halogen lamp has been conventionally employed as a light source which applies light to an original. Recently, an apparatus using an LED light source in place of the white light source has been put to practical use, which LED light source includes a large number of light emitting diodes (LED) which emit light of red (R), green (green), and blue (B) (additionally, infrared (IR) light may also be used to detect a defect position) are arranged on a substrate.

Due to the LED light source as described above being applied, no filter provided for color separation of the white light source is required, and the structure of the apparatus becomes simple. Further, setting of conditions of each color balance or the like can also be simplified.

However, in the LED light source used by the image reading apparatus described above, when an environmental temperature at the position where the LED light source is disposed, changes or when variation of temperature is caused by generation of heat from the light source itself, the wavelength of light emitted from the light source or the amount of emitted light changes. Therefore, there exists a problem in that image data read at the time before and after variation of temperature may change and image data of high quality cannot be obtained.

In order to solve the above-described problem, the technique disclosed in Japanese Patent Application Laid-Open (JP-A) No. 7-175035 can be applied, wherein a Peltier element (a Peltier device) is contact fixed to a reverse surface of a light source or a reflection plate, and a temperature sensor is provided in the vicinity of the light source, and temperature control is effected so that the temperature detected by the temperature sensor becomes a set value.

However, in the technique disclosed in JP-A No. 7-175035, a Peltier element having a great amount of radiation heat is used to adjust the temperature of the light source. Therefore, a large-size fan is required for discharging radiation heat. As a result, there exists a problem in that an entire apparatus is made larger.

Further, in the technique in which a Peltier element is used for temperature control, which includes the technique disclosed in JP-A No. 7-175035, generally, when the Peltier element is mounted at a position at which the temperature is adjusted, it is adhesion fixed to the position by using an adhesive having a high thermal conductivity. Therefore, there exists a problem in that assembling efficiency and maintenability are poor.

Moreover, the technique disclosed in JP-A No. 7-175035 has a problem in that, when the temperature of the light source is rapidly raised by the Peltier element, moisture condensation may be caused in the light source or members provided in the vicinity of the light source. In this case, there exist problems in that the apparatus is apt to fail, and when moisture condensation occurs in the light source, uniformity of light emitted from the light source is not maintained, thereby resulting in no high quality image data being obtained.

SUMMARY OF THE INVENTION

The present invention has been accomplished so as to solve the above-described problems. A first object of the present invention is to provide a light source device which can prevent formation of a large-sized device, and a second object thereof is to provide a light source device of which assembling efficiency and maintenability can be improved, and further, a third object of the present invention is to provide an image reading method and apparatus in which occurrence of moisture condensation can be prevented.

In order to achieve the above-described object, a first aspect of the present invention is a light source device comprising: a light source which emits light; a temperature detecting section for detecting a temperature of the light source; a temperature adjusting element which adjusts the temperature of the light source by effecting at least one of heat absorption and heat radiation; a heat radiating member which radiates heat of at least one of the light source and the temperature adjusting element, the heat radiating member being disposed in contact with a housing body of the device; and a control section for controlling the temperature adjusting element so that a temperature detected by the temperature detecting section becomes a predetermined temperature.

The above-described temperature detecting section may be any temperature sensor such as thermistor, thermocouple, and the like. The above-described temperature adjusting element may be any element or device such as a Peltier element (a Peltier device), which is capable of absorbing heat and radiating the heat. The above-describe heat radiating member may be any member such as a radiating fin, which is capable of radiating heat.

Further, as the material used for the above-described device housing body, materials having a high thermal conductivity, for example, metal such as aluminum or copper, or ceramics are used.

According to the first aspect of the present invention, the temperature adjusting element is controlled by the control section so that the temperature detected by the temperature detecting section becomes a predetermined temperature. The predetermined temperature mentioned herein may preferably be a temperature at which light can be stably emitted from the light source, or a temperature at which deterioration of the light source with passage of time can be restrained.

As described above, according to the light source device of the first aspect, the heat radiating member for radiating heat of at least one of the light source and the temperature adjusting element for adjusting the temperature of the light source, is disposed in contact with the device housing body, thereby making it possible to efficiently discharge heat from the light source and the temperature adjusting element.

Accordingly, a fan provided for discharging radiated heat can be made smaller, thereby preventing the device from being made larger.

Further, according to a second aspect of the present invention, in the structure of the first aspect, it is preferable that a fan for cooling the, heat radiating member is further provided and the control section controls so as to operate the fan when the temperature detected by the temperature detecting section is higher than the predetermined temperature.

According to the second aspect, the fan for cooling the heat radiating member is controlled by the control section in the first aspect of the present invention so as to operate when the temperature detected by the temperature detecting section is higher than the predetermined temperature. The above-described fan may be any fan such as a scirocco fan (a multi-blade fan), a turbo fan, a plate fan, an axial-flow fan and the like.

As described above, according to the second aspect, the same effect as that of the first aspect can be obtained, and when the temperature detected by the temperature detecting section is higher than the predetermined temperature, the fan is controlled so as to operate. Accordingly, an effect of radiating heat by the heat radiating member can be obtained and temperature adjustment control can be effected with high accuracy.

In order to achieve the above-described object, a third aspect of the present invention is a light source device comprising: a light source in which a plurality of light emitting elements are arranged on a substrate; a temperature detecting section for detecting a temperature of the light source; a temperature adjusting element which adjusts the temperature of the light source by effecting at least one of heat absorption and heat radiation; a heat radiating member for radiating heat of at least one of the light source and the temperature adjusting element; an urging section for integrally forming the light source, the temperature adjusting element, and the heat radiation member by urging force thereof; and a control section for controlling the temperature adjusting element so that a temperature detected by the temperature detecting section becomes a predetermined temperature.

The above-described light emitting element may be any element such as light emitting diode, semiconductor laser, electro luminescence (EL) element, and the like, which is capable of being mounted on a substrate. The above-described temperature detecting section may be any temperature sensor such as thermistor, thermocouple, and the like. The temperature adjusting element may be any element such as Peltier element, power transistor, and the like, which is capable of at least one of absorbing heat and radiating heat. Further, the heat radiating member may be any member such as a radiating fin, which is capable of radiating (discharging) heat, and the urging section may be any member which is capable of generating urging force, for example, spring such as compression spring and plate spring, and elastic material such as rubber.

Further, according to the third aspect of the present invention, the temperature adjusting element is controlled by the control section so that the temperature detected by the temperature detecting section becomes a predetermined temperature. The above-described predetermined temperature is preferably a temperature at which light can be stably emitted from the light source, or a temperature at which deterioration of the light source with passage of time can be prevented.

As described above, according to the third aspect of the present invention, the light source in which a plurality of light emitting elements are arranged on a substrate (for example, in a two-dimensional manner), the temperature adjusting element for adjusting the temperature of the light source by effecting at least one of absorbing heat and radiating heat, and the heat radiating member for radiating heat of at least one of the light source and the temperature adjusting element are formed integrally by urging force of the urging section. Therefore, as compared with a conventional structure in which the light source, temperature adjusting member, and heat radiation member are formed integrally by adhesion, assembling efficiency and maintenability of the device can be substantially improved.

According to a fourth aspect of the present invention, in the structure of the third aspect, preferably, in the light source, the temperature adjusting element and the heat radiating member which are integrally formed, elastic members are further provided which are interposed between respective contact surfaces of the light source, temperature adjusting element, and heat radiating member.

As a result, it is possible to reduce force applied to urged positions on the contact surfaces when the light source, temperature adjusting element, and heat radiation member are formed integrally. Accordingly, breakage of each component can be prevented and the state in which these components closely contact with one another, can be improved.

Further, in a fifth aspect of the present invention, the elastic members of the fourth aspect are preferably formed so as to include material having a high thermal conductivity.

As a result, thermal conductivity of a heat radiation path between the light source, the temperature adjusting element, and the heat radiating member can be improved, and adjustment of the temperature of the light source by the temperature adjusting element and radiation of heat by the heat radiating member can be carried out efficiently.

Further, according to a sixth aspect of the present invention, in any one of the third, fourth and fifth aspects, preferably, a fan for cooling the heat radiating member is further provided, and the control section controls so as to operate the fan when the temperature detected by the temperature detecting section is higher than the predetermined temperature.

According to the light source device of the sixth aspect, the fan for cooling the heat radiating member is controlled by the control section in any one of the third to fifth aspects so as to operate when the temperature detected by the temperature detecting section is higher than the predetermined temperature. The above-described fan comprises any fan such as scirocco fan, turbo fan, plate fan, axial-flow fan and the like.

As described above, according to the sixth aspect, the same effect as that of any one of the third to fifth aspects can be obtained, and when the temperature detected by the temperature detecting section is higher than the predetermined temperature, the fan is controlled so as to operate. Accordingly, an effect of radiating heat by the heat radiating member can be improved and temperature adjustment control can be carried out with high accuracy.

Further, according to a seventh aspect of the present invention, in any one of the first to sixth aspects, preferably, a dampproofing member is further provided, which has a dampproofing effect and which is disposed so that at least one of the plurality of light emitting elements (the light source) and the temperature adjusting element is isolated from the outside in a state of being combined with other member. As the material used for the dampproofing member, polyether-based polyurethane, polyester-based polyurethane and the like can be used.

As a result, occurrence of moisture condensation in at least one of the light emitting elements and the temperature adjusting element, which is (are) isolated from the outside, can be prevented.

In order to achieve the above-described object, an eighth aspect of the present invention is an image reading apparatus for reading an image on an original, comprising: a light source device according to any one of the first to seventh aspects; an image sensor which receives light emitted from the light source device and reflected by or transmitted through the original, thereby reading an image on the original; and a device temperature detecting section for detecting a temperature within the image reading apparatus, wherein only when the temperature detected by the device temperature detecting section becomes a prefixed temperature or higher, the control section of the light source device controls the temperature adjusting element.

According to the eighth aspect of the present invention, light emitted from the light source device in any one of the first to seventh aspects and reflected by or transmitted through an original is received by the image sensor, and an image on the original is read. The temperature within the device is detected by the device temperature detecting section. The above-described image sensor comprises any photoelectric transfer element in addition to CCD such as linear CCD and area CCD. Further, the device temperature detecting section comprises any temperature sensor such as thermistor, thermocouple and the like.

According to the eighth aspect, the above-described temperature adjusting element is controlled by the control section in the light source device only when the temperature detected by the device temperature detecting section becomes a prefixed temperature or higher.

As described above, according to the image reading apparatus of the eighth aspect, the temperature adjusting element is controlled only when the temperature within the device becomes the prefixed temperature or higher. Therefore, the state in which the temperature of the light source is rapidly raised by the temperature adjusting element can be avoided, and occurrence of moisture condensation can be prevented.

Moreover, a ninth aspect of the present invention is an image reading method of an image reading apparatus for reading an image on an original, in which the image reading apparatus comprises a light source device according to any one of the first to seventh aspects, wherein only when the temperature within the image reading apparatus becomes a prefixed temperature or higher, the temperature adjusting element is controlled by the control section of the light source device.

Accordingly, the image reading method of the ninth aspect has the same function as that of the eighth aspect. Therefore, in the same manner as in the eighth aspect, the state in which the temperature of the light source is rapidly raised by the temperature adjusting element, can be avoided, and occurrence of moisture condensation can be prevented.

According to a tenth aspect of the present invention in any one of the first to the ninth aspects, in any one of the first to the ninth aspects, the predetermined temperature is set so as to be higher than an environmental temperature at a position in which the light source device is disposed.

BRIEF DESCRIPTION OF THE DRAWINGS

FIG. 5 is a perspective view which schematically shows an LED substrate in the light source portion according to the embodiment of the present invention.

DESCRIPTION OF THE PREFERRED EMBODIMENTS

An embodiment of the present invention will be hereinafter described in detail with reference to the attached drawings. The following description will be given in a case in which the present invention is applied to a digital laboratory system.

Figure 1:
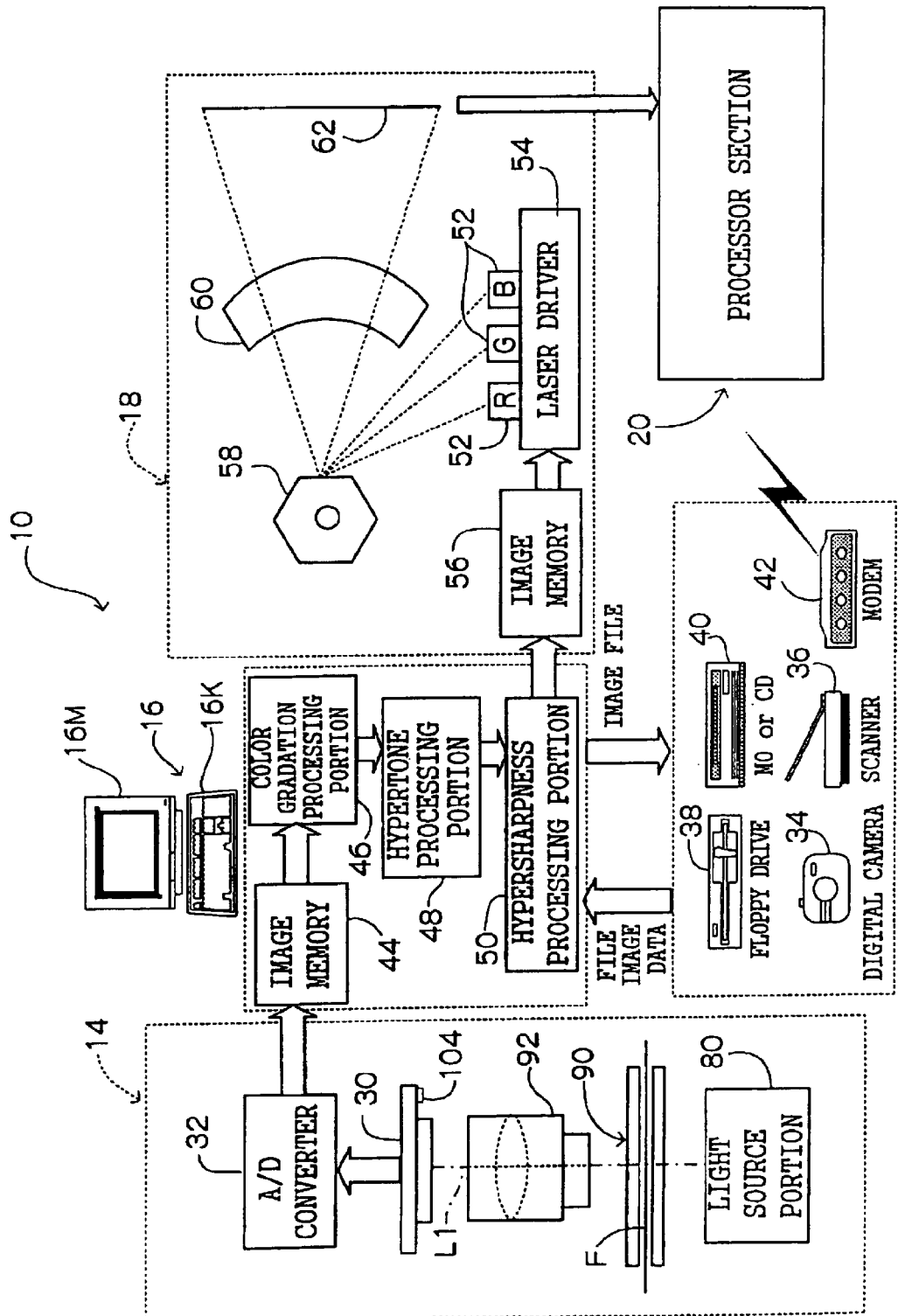
FIG. 1 is a schematic structural diagram of a digital laboratory system according to an embodiment of the present invention.
Figure 2:
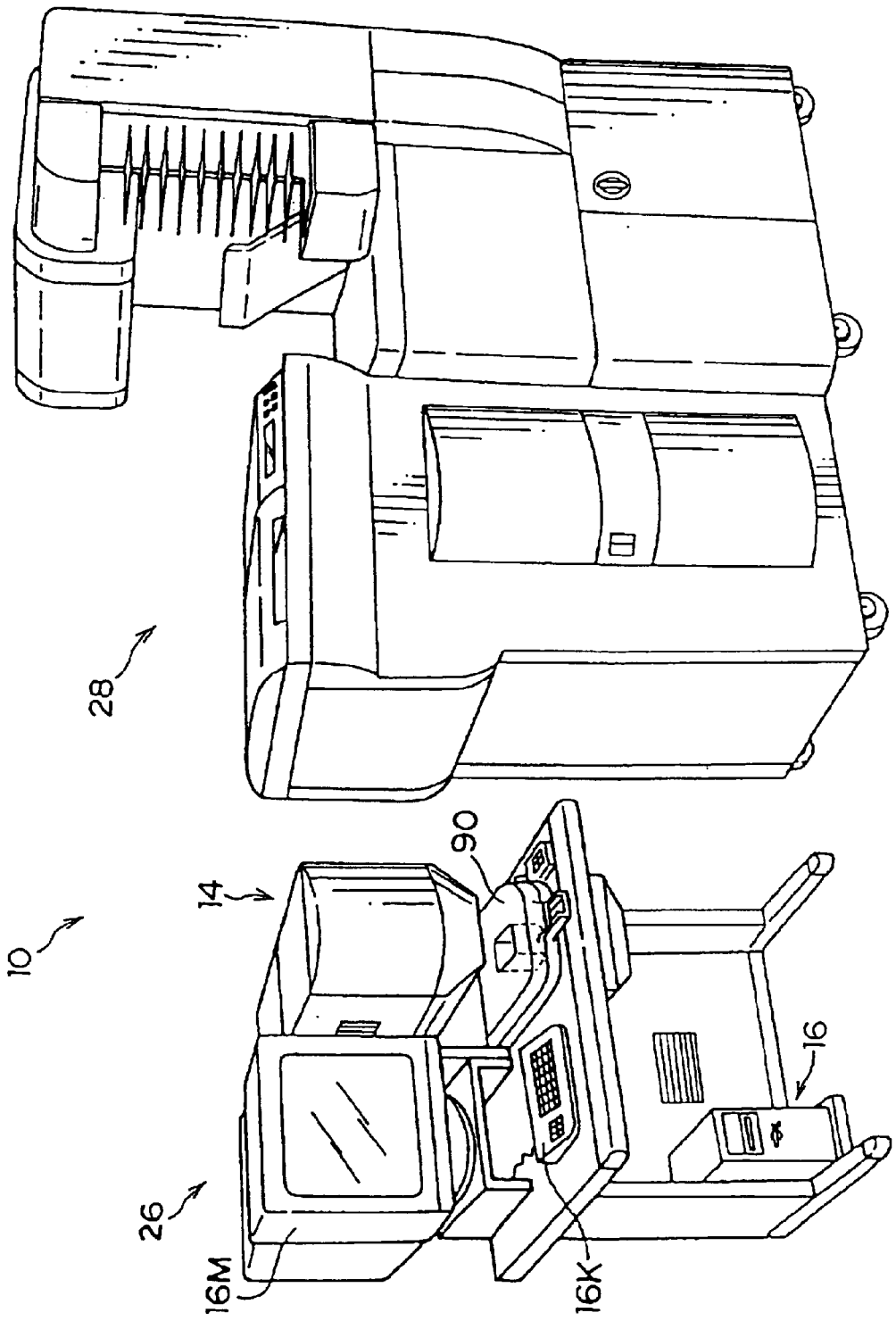
FIG. 2 is an outside view of the digital laboratory system according to the embodiment of the present invention.

Schematic Structure of the Entire System:

FIGS. 1 and 2 each show a schematic structure of a digital laboratory system 10 according to the present embodiment.

As shown in FIG. 1, the digital laboratory system 10 is structured so as to include an area CCD scanner section 14, an image processing section 16, a laser printer section 18, and a processor section 20. The area CCD scanner section 14 and the image processing section 16 are integrated as an input section 26 shown in FIG. 2. The laser printer section 18 and the processor section 20 are integrated as an output section 28 shown in FIG. 2.

The area CCD scanner section 14 is used to read frame images recorded on a photographic film such as a negative film or a reversal film. For example, frame images on a 135-size photographic film, a 110-size photographic film, a photographic film with a transparent magnetic layer formed thereon (i.e., a 240-size photographic film: a so-called APS film), and 120-size and 220-size (Brownie-size) photographic films can be read. In the area CCD scanner section 14, the above-described frame images to be read are read by an area CCD 30 and subjected to analog/digital (A/D) conversion in an A/D converter 32, and thereafter, image data subjected to shading correction is outputted to the image processing section 16.

Shading correction is used to correct ununiformity of photoelectric transfer characteristics of the area CCD 30 per cell, and illumination unevenness. In a state in which an adjusting film image of which image plane entirely has a fixed density, is set in the area CCD scanner section 14, or in a state in which no original such as photographic film is set in the area CCD scanner section 14, an image is read by the area CCD 30, and based on image data outputted from the area CCD 30 (irregularities of density for each pixel represented by the image data is caused by ununiformity of photoelectric transfer characteristics between cells, and illumination unevenness), a gain (that is, shading data) is set for each cell, and image data of film images to be read, outputted from the area CCD scanner section 14, is corrected for each pixel in accordance with the gain set for each cell.

In the present embodiment, the digital laboratory system 10 in a case in which a 240-size photographic film (APS film) F is used therein, will be described hereinafter.

The image processing section 16 inputs image data (scan image data) outputted from the area CCD scanner section 14, and is provided so as to be capable of inputting, from externally, image data obtained by photographing using a digital camera 34 or the like, image data obtained by reading an original (for example, a reflection original) with a scanner 36 (of flat-bed type), image data generated by a different computer and recorded on a floppy disk (FD), a magneto-optical disk (MO), a compact disk (CD) or the like, and further inputted via a floppy disk drive 38, an MO or CD drive 40 or the like, and communication image data received via a modem 42 (these image data are generically referred to as file image data).

The image processing section 16 stores the inputted image data in an image memory 44 and effects image processing such as various corrections for the image data in a color gradation processing portion 46, a hypertone processing portion 48, a hypersharpness processing portion 50 and the like. The image data subjected to image processing is outputted, as recording image data, to the laser printer section 18. Further, the image processing section 16 can also output externally the image data subjected to image processing as an image file (for example, it can output the image data to a storage medium such as FD, MO, CD or the like, or can transmit the image data to other information processing equipment via a communication line).

The laser printer section 18 includes laser light sources 52 of red (R), green (G), and blue (B). A laser driver 54 is controlled and laser light modulated in correspondence to recording image data inputted from the image processing section 16 (which image data is temporarily stored in the image memory 56) is applied to a photographic printing paper 62, and further, an image (latent image) is recorded on the photographic printing paper 62 by scan and exposure (in the present embodiment, an optical system mainly using a polygon mirror 58 and an fθ lens 60 is used).

The processor section 20 carries out processing of color development, bleach-fix, washing and drying for the photographic printing paper 62 on which an image is recorded by scan and exposure in the laser printer section 18. As a result, an image is formed on the photographic printing paper 62.

Figure 3:
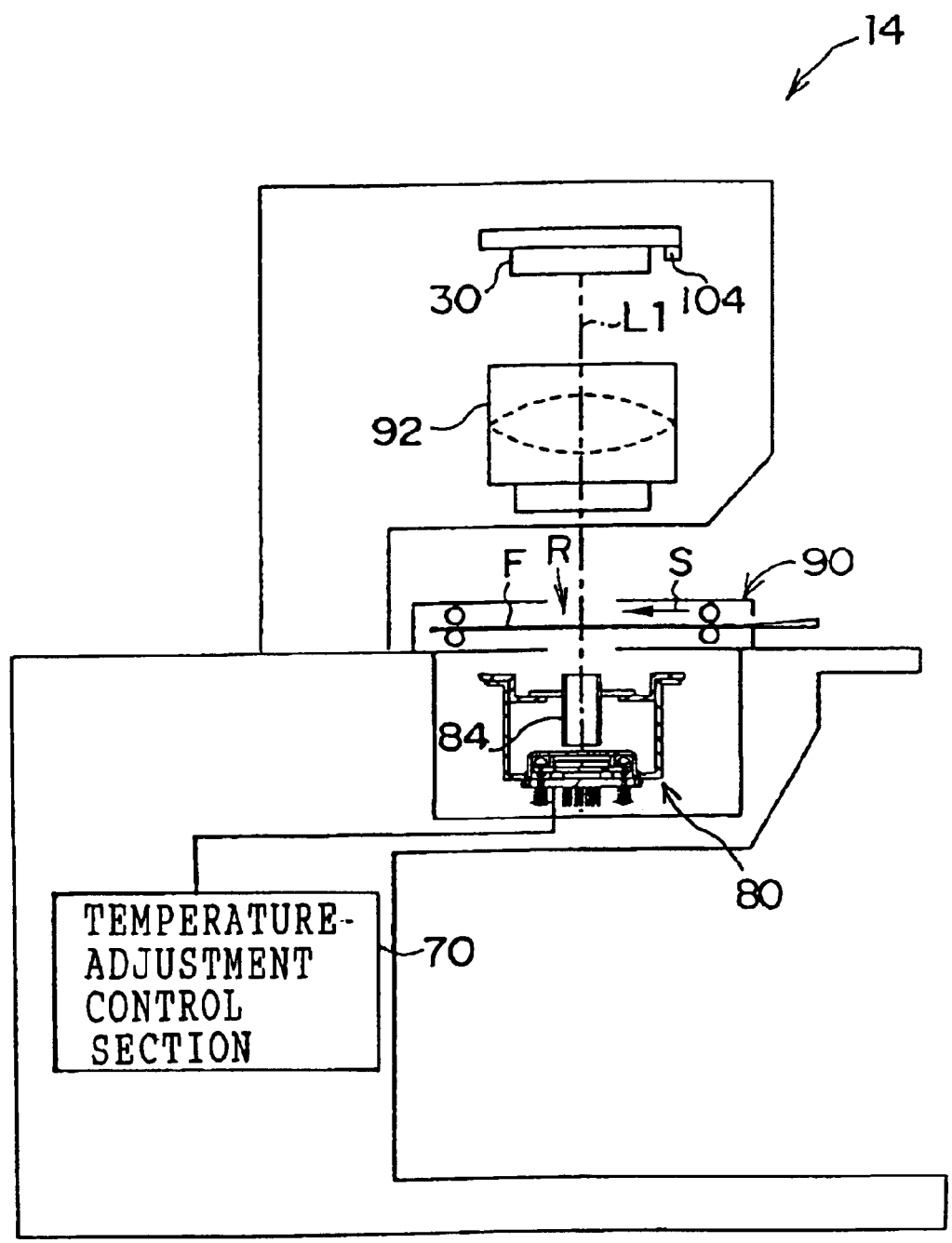
FIG. 3 is a schematic structural diagram of an area CCD scanner section in the digital laboratory system according to the embodiment of the present invention.

Structure of Area CCD Scanner Section:

Next, a description will be given of the structure of the area CCD scanner section 14, which is particularly related to the present invention. FIG. 3 schematically shows the structure of an optical system of the area CCD scanner section 14. The optical system includes a light source portion 80 which applies light to the photographic film F (that is, irradiates the photographic film F with the light). A film carrier 90 is disposed at the light emitting side of the light source portion 80 from which light is emitted, and is provided so as to convey, in a predetermined direction (i.e., the direction indicated by arrow S in FIG. 3), the photographic film F set with an image plane of a frame image thereof being made perpendicular to an optical axis L1 (that is, an optical axis of a lens unit, which will be described later, serving as an imaging optical system).

Figure 4:
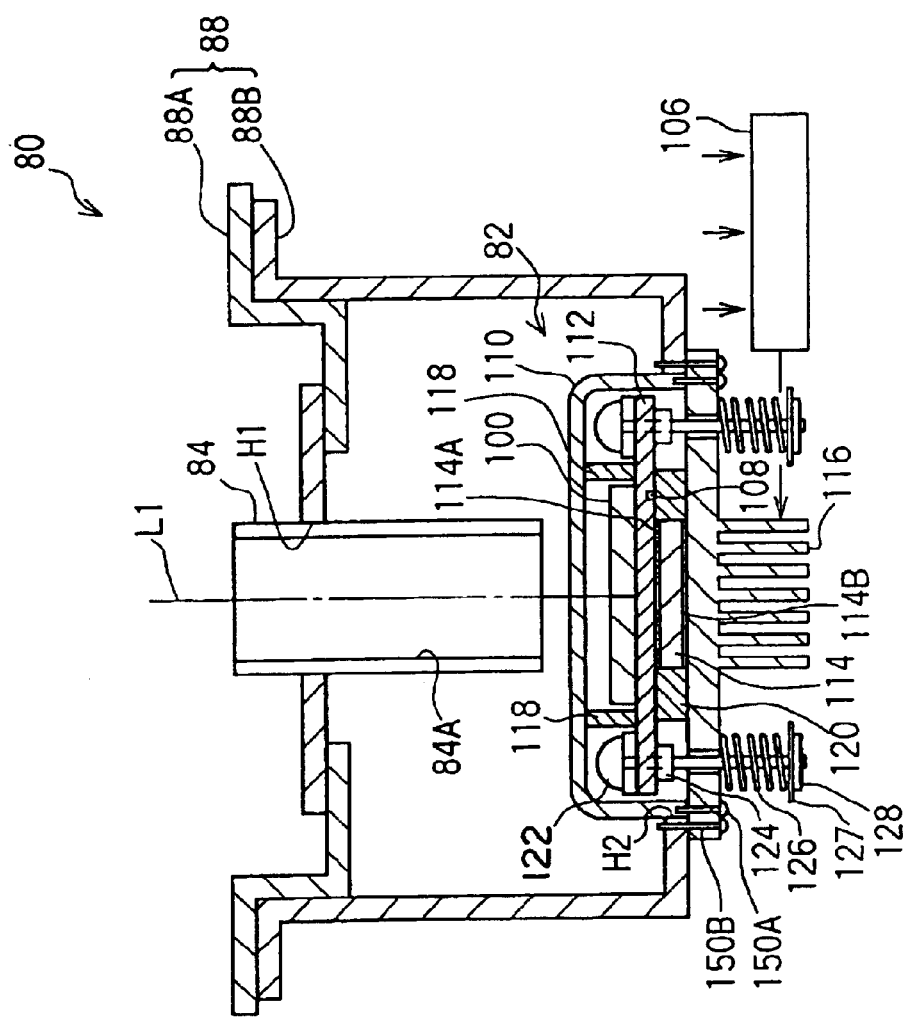
FIG. 4 is a cross-sectional side view showing a detailed structure of a light source portion in the area CCD scanner section according to the embodiment of the present invention.

The light source portion 80 according to the present embodiment is, as shown in FIG. 4, structured in such a manner that a light source housing body 88 formed by a combination of an upper housing body 88A and a lower housing body 88B, is provided as a casing so as to cover an LED light source portion 82 which will be described later.

An opening H1 having a rectangular configuration when seen from the top is formed in the upper housing body 88A, and a diffusion box 84 is mounted in the opening H1. A diffusion box guiding member (not shown) is provided in the vicinity of the opening H1. When the diffusion box 84 is mounted in the opening H1, it is guided by the diffusion box guiding member and mounted exactly at a predetermined mounting position.

Further, an opening H2 having a rectangular configuration when seen from the top is also formed in the lower housing body 88B, and the LED light source portion 82 is provided in the opening H2.

The LED light source portion 82 is structured so as to include an LED substrate 100, an acrylic cover 110, a base 112, a Peltier element 114, and a radiating fin 116.

As shown in FIG. 5, the LED substrate 100 is structured in such a manner that a large number of LED elements 102 are arranged thereon in a two-dimensional manner, and is provided so as to emit light in the direction along the optical axis L1.

The LED elements 102 according to the present embodiment are provided in such a manner that, along the direction indicated by arrow A in FIG. 5, one row of LED elements emitting light of blue (B), one row of LED elements emitting infrared light (IR), one row of LED elements emitting light of green (G), and one row of LED elements emitting light of red (R) are repeatedly arranged in the order of B, IR, G, and R.

Further, respective terminals of the LED elements 102 on the LED substrate 100 are each connected to a connector 152 provided at an end of the LED substrate 100 by wiring (not shown). The connector 152 is connected to a main control section (not shown) which manages an entire operation of the area CCD scanner section 14, and the LED elements 102 can each be controlled by the main control section in an on/off state for each of colors R, G, B, and IR of emitted light.

As shown in FIG. 4, the surface of a base 112 with a temperature detecting portion of a thermistor 108 being contact fixed at an end thereof, is adhesion fixed, by an adhesive having a high thermal conductivity, onto the reverse surface of the LED substrate 100, which is opposite to the side at which the LED elements are disposed. The base 112 is made of metal such as aluminum or copper, having a high thermal conductivity. The base 112 serves to reduce irregularities in the temperature, resulting from local light emission of a group of LED elements on the LED substrate 100, and to uniformly change the temperature of the LED substrate 100 at the time of temperature-adjustment control by the Peltier element 114, which will be described later. Further, the base 112 also serves to prevent deformation (such as warping) of the LED substrate 100 when the LED substrate 100, the Peltier element 114, and the radiating fin 116 are formed integrally.

The base 112 formed integrally with the LED substrate 100 as described above, is integrated with the Peltier element 114 and the radiating fin 116 by a plurality of pins 122, sleeves 124 made of resin, compression springs 126, collars 127, and E-type retaining rings 128 so that the reverse surface of the base 112 opposite to the side at which the base 112 adheres to the LED substrate 100, and one surface of the Peltier element 114 closely contact each other via an elastic member 114A having a high thermal conductivity, and the surface of the radiating fin 116 at the side at which no fin is provided, and another surface of the Peltier element 114 closely contact each other via an elastic member 114B having a high thermal conductivity.

In other words, through holes are formed at plural positions in the vicinity of an end of the base 112, and through holes are formed in the radiating fin 116 at positions corresponding to the above-described through holes. The Peltier element 114 is interposed between the base 112 and the radiating fin 116 via the elastic members 114A and 114B, and each shaft portion of a pin 122 is inserted into a corresponding through hole from the side of the base 112 through a sleeve 124 so as to allow both the through hole of the base 112 and the corresponding through hole of the radiating fin 116 to be inserted by the shaft portion of the pin 122. Thereafter, a compression spring 126 is mounted around the shaft portion of the pin 122 projecting from the surface of the radiating fin 116 on which a fin (fin portion) is formed.

A portion near the end of the shaft portion of each pin 122 is formed as a small-diameter (neck) portion, and a through hole is formed in each E-type retaining ring 126 so as to correspond to the above-described small-diameter portion.

The E-type retaining ring 126 is mounted at the end of the shaft portion of the pin 122 by engaging the above-described through hole of the E-type retaining ring 128 in the small-diameter portion near the end of the shaft portion of the pin 122, with the compression spring 126 being interposed between the radiating fin 116 and the collar 127 having a diameter larger than the E-type retaining ring 128. The force for engaging the E-type retaining ring 128 in the pin 122 is designed so as to be larger than urging force of the compression spring 126 mounted between the radiating fin 116 and the E-type regaining ring 128. Therefore, there is no possibility that the E-type retaining ring 128 is separated from the shaft portion of the pin 122 due to urging force of the compression spring 126. Further, when the E-type retaining ring 128 is removed from the shaft portion of the pin 122 at the time of maintenance or the like, the E-type retaining ring 128 can be easily removed by using pliers (for example, radio-pliers) or the like.

As described above, in the LED light source portion 82 according to the present embodiment, the LED substrate 100, the Peltier element 114, and the radiating fin 116 are formed integrally by the urging force of the compression spring 126. Therefore, as compared with a conventional structure in which the LED substrate 100, Peltier element 114, and radiating fin 116 are integrated by adhesion, assembling efficiency and maintenability can be substantially improved.

A dampproofing member 120 having a dampproofing (moisture proofing) effect is disposed between the base 112 and the radiating fin 116 so as to surround the Peltier element 114. As a result, moisture condensation of the Peltier element 114 can be prevented.

In the present embodiment, polyether-based polyurethane is used as a material for the dampproofing member 120. Further, heat conductive silicon is used as materials for the elastic members 114 A and 114B.

A hole into which a screw 150A can be driven, is formed at each of plural positions at the end of the acrylic cover 110, and a hole into which the screw 150A can be driven, is formed at a position on the radiating fin 116, corresponding to each of the above-described holes formed on the acrylic cover 110. The acrylic cover 110 and the radiating fin 116 are structured integrally in such a manner that the screws 150A are respectively driven into corresponding holes at the plural positions.

At this time, a dampproofing member 118 having a dampproofing effect is disposed between the acrylic cover 110 and the base 112 so as to surround the LED substrate 100. As a result, moisture condensation of the LED substrate 100 can be prevented.

A hole into which a screw 150B can be driven, is formed at each of plural positions on the lower housing body 88B in the vicinity of the opening H2, and a hole into which the screw 150B can be driven, is formed at a position on the radiating fin 116, corresponding to each of the above-described holes formed on the lower housing body 88B. The lower housing body 88B and the radiating fin 116 are structured integrally in such a manner that the screws 150B are respectively driven into corresponding holes at the plural positions.

A fan 106 is disposed near and at the side of the fin formed in the radiating fin 116. The fan 106 in the present embodiment, as shown in FIG. 4, takes the structure of a so-called scirocco fan which sucks in air from the upper side and blows off the air from the side portion. When the fan which is capable of blowing off air from the side portion thereof, is used as a cooling fan for the radiating fin 116, the fan can be disposed at the side of the fin of the radiating fin 116. As compared with a case in which the fan is disposed so as to face the end of the fin in the radiating fin 116, the space required by the light source portion 80 can be reduced.

Further, the scirocco fan has an excellent effect of localized cooling. In this respect as well, the scirocco fan is preferably used as a cooling fan for the radiating fin 116.

As described above, in the LED light source portion 82 according to the present embodiment, the radiating fin 116 and the light source housing body 88 contact each other, and therefore, radiation of heat (heat dissipation) at the time of temperature-adjustment control by the Peltier element 114 can be efficiently performed. Accordingly, the fan 106 can be made into a small-sized fan. As a result, formation of the light source portion 80 into a large-sized structure can be prevented.

The diffusion box 84 is formed into a cylinder of which upper end and lower end are open. The diffusion box 84 is mounted in the opening H1 of the upper housing body 88A in such a manner that the opening at the lower end thereof faces a region on the LED substrate 100 in which the LED elements 102 emit light. Accordingly, light emitted from the LED light source portion 82 is made incident into the diffusion box 84 in such a manner as to scarcely cause any loss in the amount of light.

A reflection diffusing surface 84A is formed on an inner peripheral surface of the diffusion box 84 and has high total reflectance and diffuse reflectance of light and substantially uniform spectral reflection characteristics and spectral diffuse reflection characteristics. Although the above-described "light" section, generally, electromagnetic wave having a wave band of 1 nm to 1 mm, the "light" mentioned herein section light having at least a visible region (a wave band having a range from about 400 nm to 750 nm).

The reflection diffusing surface 84A is formed by coating a material having high reflectance and diffuse reflectance of light and also having substantially uniform spectral reflection characteristics and spectral diffuse reflection characteristics, onto the inner peripheral surface of the diffusion box 84, or by forming the inner peripheral surface of the diffusion box 84 using a material having high reflectance and diffuse reflectance of light and also having substantially uniform spectral reflection characteristics and spectral diffuse reflection characteristics.

The diffusion box 84 guides light emitted form the LED light source portion 82 to a position near the film carrier 90 disposed above the diffusion box 84, and emits the light, as light (illuminating light) corresponding to a frame image to be read, toward the photographic film F supported at a reading position R in the film carrier 90. At this time, due to the light being diffused and reflected by the reflection diffusing surface 84A in irregular directions, ununiformity in the amount of light from the LED light source portion 82 is reduced (i.e., ununiform distribution of the amount of light is corrected). Further, the reflection diffusing surface 84A diffuses and reflects light without making a change in the relative balance (so-called color balance) in the amounts of light of red, green, and blue emitted from the LED light source portion 82. Therefore, light is emitted from the diffusion box 84 in a state in which the balance in the amount of the emitted light from the diffusion box 84 is substantially maintained as the same as that of the incident light which enters the diffusion box 84 (i.e., light emitted from the LED light source portion 82).

The light source portion 80 having the above-described structure is provided so that the center of the diffusion box 84 and the center of the light emission region of the LED light source portion 82 each correspond to the optical axis L1 in a state of being disposed at a predetermined position in the area CCD scanner section 14.

An opening through which light emitted from the light source portion 80 passes, is formed on each of the upper and lower surfaces of the film carrier 90 so as to correspond to a frame image set at the reading position R. Light emitted from the light source portion 80 (specifically, the diffusion box 84) is applied to the photographic film F through the opening formed on the lower surface of the film carrier 90, and light having an amount of light corresponding to density of a frame image supported at the reading position R, is transmitted through the photographic film F. The light transmitted through the photographic film F is emitted from the opening formed on the upper surface of the film carrier 90.

A lens unit 92 for imaging light transmitted through the frame image, and the area CCD 30 are sequentially disposed along the optical axis L1 at the side of the photographic film F opposite to the side at which the light source portion 80 is disposed. The lens unit 92 is shown as a single lens, but the lens unit 92 is practically a zoom lens comprised of a plurality of lenses. Further, a SELFOC lens may also be used as the lens unit 92. In this case, both end surfaces of the SELFOC lens are preferably made close to the photographic film F and the area CCD 30 respectively as far as possible.

A sensing portion is provided at the side of the area CCD 30 on which light is made incident. The sensing portion includes a plurality of CCD cells arranged in a two-dimensional manner and an electronic shutter mechanism. The area CCD 30 is disposed so that a light receiving surface of the sensing portion coincides with a position at which an image is formed in the lens unit 92. A shutter (not shown) is provided between the area CCD 30 and the lens unit 92.

The area CCD 30 detects density information of a frame image positioned at the reading position R in the film carrier 90 and outputs as an image signal to the A/D converter 32 (see FIG. 1). The A/D converter 32 effects digital conversion for the image signal from the area CCD 30. The area CCD scanner section 14 transmits the digital signal, as image data, to the image processing section 16.

A thermistor 104 for detecting the temperature in the vicinity of the area CCD 30, is provided in the vicinity of the area CCD 30. The thermistor 104 is connected to the main control section (not shown). When the temperature detected by the thermistor 104 indicates an abnormal state, the main control section displays a message which indicates an abnormal state, on a display 16 M (also seen in FIG. 2) provided in the image processing section 16, and further controls so as to stop the operation of the area CCD scanner section 14.

Further, the area CCD scanner section 14 according to the present embodiment includes a temperature-adjustment control section 70 (see FIG. 3) which effects control (hereinafter referred to as "temperature-adjustment control") so as to allow the temperature of the LED elements 102 to become constant at a predetermined temperature (to fall within a predetermined temperature range) (hereinafter referred to as "target temperature-adjusted value"), for the purpose of preventing change in the state of emitting light, which is caused by variation in the temperature of a large number of LED elements 102 provided in the LED light source portion 82. The following description will be given in a case in which the target temperature-adjusted value is 40.0° C. The target temperature-adjusted value corresponds to a predetermined temperature according to the aspects of the present invention.

Figure 6:
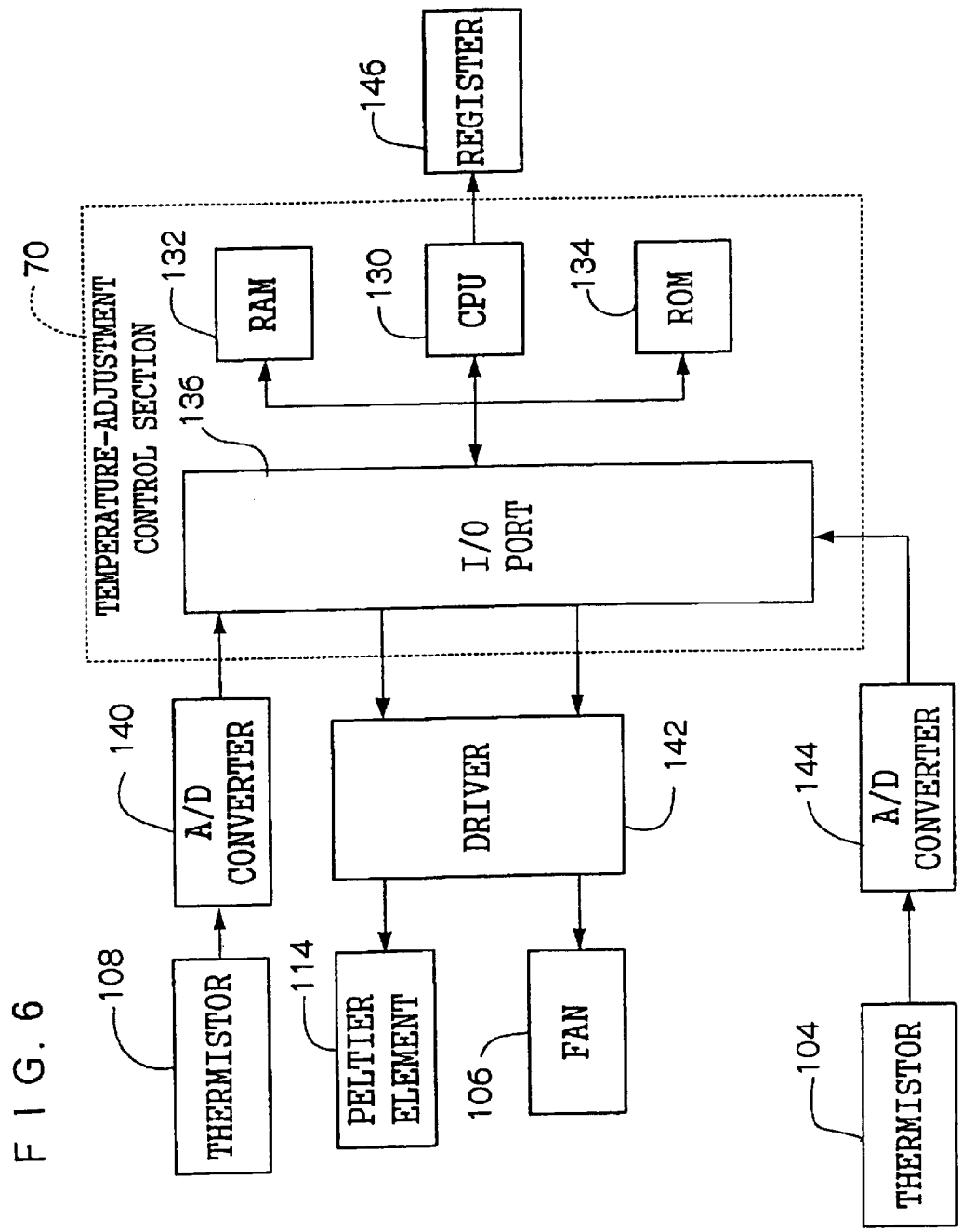
FIG. 6 is a block diagram which schematically shows the structure of an electric system relating to a temperature-adjustment control portion in the area CCD scanner section according to the embodiment of the present invention.

FIG. 6 schematically shows the structure of an electric system relating to the temperature-adjustment control section 70. As shown in this drawing, the temperature-adjustment control section 70 includes a central processing unit (CPU) 130 which manages the operation of the temperature-adjustment control section 70, a RAM 132 used as a work area or the like of a temperature-adjustment control program which is executed when temperature-adjustment control is effected by the CPU 130, a ROM 134 in which the above-described temperature-adjustment control program, various parameters, and the like are stored, and an I/O port 136 which carries out input and output of various signals between the temperature-adjustment control section 70 and the outside. The CPU 130, RAM 132, ROM 134, and I/O port 136 are connected with one another by a bus.

The thermistor 108 is connected via an A/D converter 140 to the I/O port 136, and the Peltier element 114 and fan 106 are each connected via a driver 142 to the I/O port 136. The CPU 130 can detect the temperature at the position in which the thermistor 108 is disposed (i.e., the end portion of the base 112), and can also control drive of the Peltier element 114 and fan 106 by the driver 142.

Further, the thermistor 104 is connected via the A/D converter 140 to the I/O port 136. The CPU 130 can detect the temperature at the position in which the thermistor 104 is disposed (i.e., the position in the vicinity of the area CCD 30).

A register 146 connected to the main control section (not shown), is connected to the CPU 130, and the CPU 130 stores therein information which indicates a temperature-adjustment control state and the state of the light source portion 80 for a predetermined region of the register 146.

Examples of various states of temperature-adjustment control, various states of the light source portion 80, and information (numerical information) corresponding to these states are shown in Table 1.

TABLE 1

| States | Numerical information |
|---|---|
| detected temperature: 40.0 ± 0.5° C. | 1 |
| detected temperature: 40.5 to 45.0° C. or 35.0 to 39.5° C. | 2 |
| detected temperature: 0.0 to 35.0° C. | 3 |
| detected temperature: 45.0 to 60.0° C. | 4 |
| detected temperature: less than 0° C. or more than 60° C., or failure of LED substrate | 5 |
| failure of Peltier element | 6 |
| failure of LED power source | 7 |

As shown in Table 1, when the temperature detected by the thermistor 108, that is, the temperature at the end of the base 112 is within a range from a value lower than the target temperature-adjustment temperature by 0.5° C. to a value higher than the target value by 0.5° C., that is, a range from 39.5° C. to 40.5° C., "1" is stored, as numerical information, in the register 146. When the temperature detected by the thermistor 108 is outside the above-described range, numerical information corresponding to the temperature (any of "2" to "5") is stored in the register 146. The numerical information "5" also indicates the state in which the LED substrate 100 is damaged.

Further, when the Peltier element 114 is broken, "6" is stored, as numerical information, in the register 146. When a power source (not shown) used to turn on the LED elements 102 is broken, "7" is stored, as numerical information, in the register 146. A determination that the Peltier element 114 has been broken is made when, for example, the temperature detected by the thermistor 108 is a value other than the target temperature-adjustment value and thereabouts, and does not change at the time of temperature-adjustment control. Further, a determination that the power source for turning on the LED elements 102 has been broken, is made when, for example, the LED elements 102 have not been turned on.

The information shown in Table 1 are in advance stored in a predetermined region of the ROM 134 in a table.

The light source portion 80 corresponds to the light source device according to the aspect of the present invention, the LED substrate 100 corresponds to the light source according to the aspect of the present invention, the LED elements 102 correspond to the light emitting elements according to the aspects of the present invention, the Peltier element 114 corresponds to the temperature adjusting element according to the aspects of the present invention, the elastic members 114A and 114B correspond to the elastic members according to the aspects of the present invention, the thermistor 108 corresponds to the temperature detecting section according to the aspects of the present invention, the radiating fin 116 corresponds to the radiating member according to the aspects of the present invention, dampproofing members 118 and 120 correspond to the dampproofing members according to the aspects of the present invention the fan 106 corresponds to the fan according to the aspects of the present invention, the compression spring 126 corresponds to the urging section according to the aspects of the present invention, and the CPU 130 corresponds to the control section according to the aspects of the present invention.

Further, the area CCD scanner section 14 corresponds to the image reading apparatus according to the aspects of the present invention, the area CCD 30 corresponds to an image sensor according to the aspects of the present invention, the thermistor 104 corresponds to the device temperature detecting section according to the aspects of the present invention, and the photographic film F corresponds to an original according to the aspects of the present invention.

Figure 7:
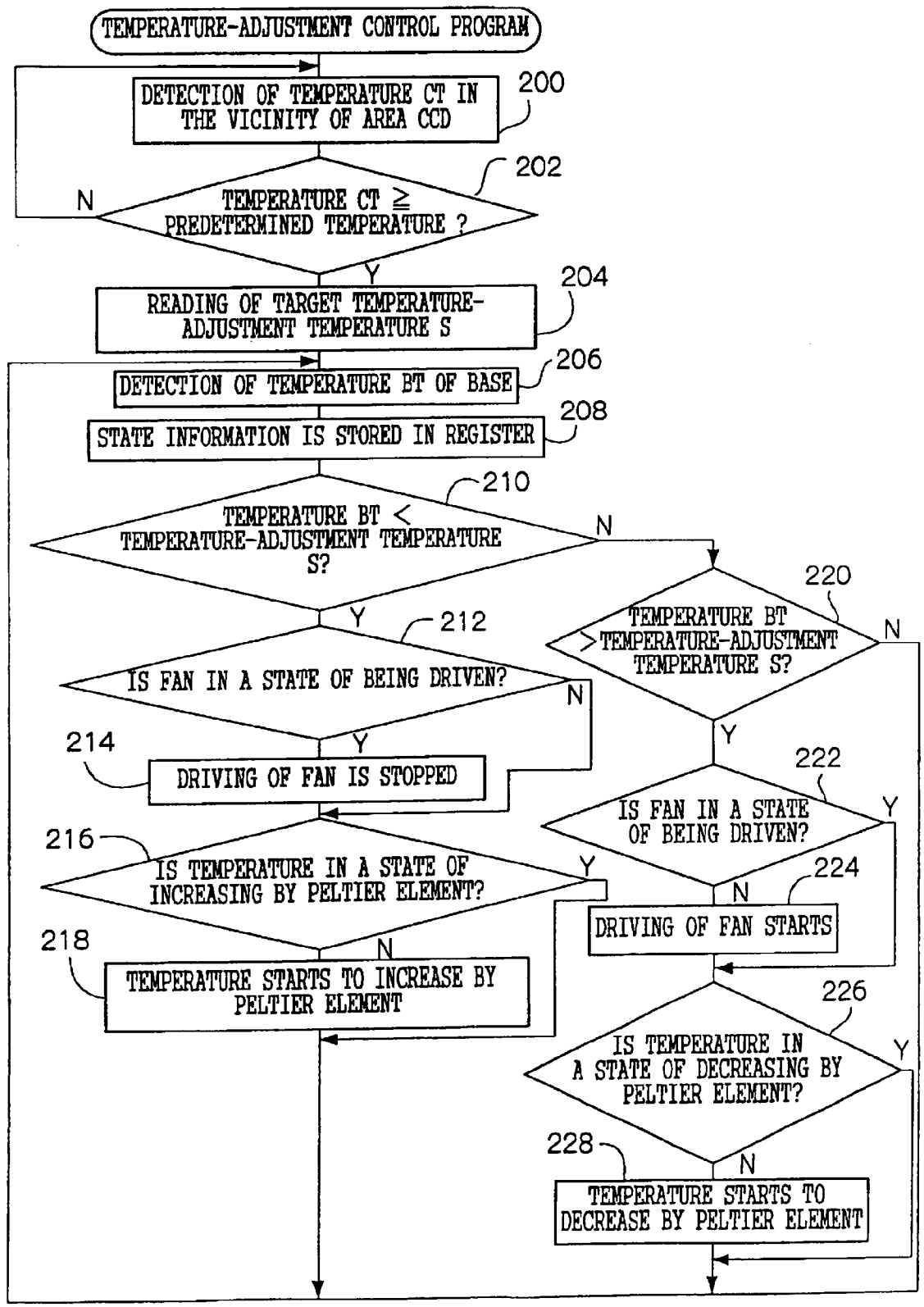
FIG. 7 is a flow chart showing the flow of a temperature-adjustment control program according to the embodiment of the present invention.

Operation:

Next, operation of the digital laboratory system 10 having the above-described structure will be described. In the digital laboratory system 10 according to the present embodiment, when the power source of the digital laboratory system 10 is turned on, temperature-adjustment control is carried out by the temperature-adjustment control section 70. First, a description will be given of the temperature-adjustment control carried out by the temperature-adjustment control section 70 with reference to FIG. 7. FIG. 7 is a flow chart which shows the flow of the temperature-adjustment control program executed by the CPU 130 of the temperature-adjustment control section 70 when temperature-adjustment control is carried out by the temperature-adjustment control section 70. The temperature-adjustment control program is in advance stored in a predetermined region of the ROM 134. Further, the target temperature-adjustment value S (in the present embodiment, 40° C.) according to the present embodiment is previously stored, as the temperature at which the LED elements 102 can stably emit light, in a predetermined area of the ROM 134.

In step 200 shown in FIG. 7, the temperature CT in the vicinity of the area CCD 30 is detected by the thermistor 104. In the subsequent step 202, it is determined whether the detected temperature CT is a predetermined temperature (for example, 5° C.) or higher. When the detected temperature is not the predetermined temperature or higher (when the decision of step 202 is negative), the process returns to step 200. When the detected temperature is the predetermined temperature or higher (when the decision of step 202 is affirmative), the process proceeds to step 204.

In the area CCD scanner section 14 according to the present embodiment, a predetermined stand-by power source voltage is applied to the area CCD 30 and to the film carrier 90 at the time of the power source of the digital laboratory system 10 being turned on, for the purpose of stabilizing the operation of the CCD scanner section 14.

Accordingly, when an environmental temperature at the position at which the area CCD scanner section 14 is disposed, is the above-described predetermined temperature or less, and the temperature in the scanner section 14 at the time of the power source being turned on, is the above-described predetermined temperature or less, the temperature in the scanner section 14 starts to increase from the time of the power source being turned on, and then, exceeds the above-described predetermined temperature. In step 200 and step 202, due to the processing being placed in a stand-by state until the temperature CT in the vicinity of the area CCD 30 reaches the above-described predetermined temperature or higher, a stand-by state is held until the temperature within the area CCD scanner section 14 becomes higher to a certain degree. As a result, moisture condensation of the light source portion 80, which is apt to occur in the subsequent temperature-adjustment control, is avoided.

In step 204, the target temperature-adjustment value S is read from the predetermined region of the ROM 134. In the subsequent step 206, the temperature BT of the base 112 is detected by the thermistor 108. In step 208, numerical information which indicate the states of temperature-adjustment control and the states of the light source portion 80 at this point of time are stored for the predetermined region of the register 146 with reference to the information shown in Table 1 stored in the ROM 134.

In other words, in the above-described step 208, when the Peltier element 114 is broken, "6" is stored, as the numerical information, for the register 146. When the power source for turning on the LED elements 102 is broken, "7" is stored as the numerical information for the register 146. In neither case, numerical information corresponding to the temperature BT detected in the above-described step 206 is stored for the register 146. As a result, when, for example, the temperature BT is within a range from a value lower than the target temperature-adjustment value by 0.5° C. to a value higher than the target value by 0.5° C., "1" is stored, as the numerical information, for the register 146.

In the subsequent step 210, it is determined whether the temperature BT detected in step 206 is lower than the target temperature-adjustment value S. When the detected temperature BT is lower than the target value (when the decision of step 206 is affirmative), the process proceeds to step 212.

In step 212, it is determined whether the fan 106 is in a state of being driven. When the fan 106 is in a state of being driven (when the decision of step 212 is affirmative), the process proceeds to step 214 in which driving of the fan 106 is stopped. Thereafter, the process proceeds to step 216. Further, when in step 212, it is determined that the fan 106 is not in a state of being driven (when the decision of step 212 is negative), the process proceeds to step 216 without performing the process of the above-described step 214.

In step 216, it is determined whether the temperature of the base 112 is in a state of increasing by the Peltier element 114. When the temperature is not in a state of increasing (when the decision of step 216 is negative), the process proceeds to step 218 in which the temperature of the base 112 starts to increase by the Peltier element 114, and thereafter, the process returns to step 206. Further, when in step 216 it is determined that the temperature of the base 112 is in a state of increasing by the Peltier element 114 (when the decision of step 216 is affirmative), the process returns to step 206 without performing the process of the above-described step 218.

When in step 210 it is determined that the temperature BT is not lower than the target temperature-adjustment value S (when the decision of step 210 is negative), the process proceeds to step 220 in which it is determined whether the temperature BT is higher than the target temperature-adjustment value S. When the temperature BT is higher (when the decision of step 220 is affirmative), the process proceeds to step 222.

In step 222, it is determined whether the fan 106 is in a state of being driven. When the fan 106 is not in a state of being driven (when the decision of step 222 is negative), the process proceeds to step 224 in which driving of the fan 106 is started. Thereafter, the process proceeds to step 226. Further, when in step 222 it is determined whether the fan 106 is in a state of being driven (when the decision of step 222 is affirmative), the process proceeds to step 226 without performing the process of the above-described step 224.

In step 226, it is determined whether the temperature of the base 112 is in a state of decreasing by the Peltier element 114. When the temperature is not in a state of decreasing (when the decision of step 226 is negative), the process proceeds to step 228 in which the temperature of the base 112 starts to decrease by the Peltier element 114. Thereafter, the process returns to step 206. Further, when in step 226 it is determined whether the temperature of the base 112 is in a state of decreasing by the Peltier element 114 (when the decision of step 226 is affirmative), the process returns to step 206 without performing the process of the above-described step 228.

When in step 220 it is determined that the temperature BT is not higher than the target temperature-adjustment value S (when the decision of step 220 is negative), it is determined that the temperature BT coincides with the target temperature-adjustment value S, and the process returns to step 206 while maintaining the states of the various portions at this point of time.

Due to repetition of the operation from the above-described step 206 to step 228, the temperature BT of the base 112 detected by the thermistor 108 is controlled so as to become uniform at (coincide with) the target temperature-adjustment value S, and the numerical information which indicate the states of temperature-adjustment control and the states of the light source portion 80 stored in the predetermined area of the register 146 are sequentially updated in accordance with the actual states thereof.

Next, operation of the entire digital laboratory system 10 according to the present embodiment at the time of image reading will be briefly described.

In the area CCD scanner section 14, the numerical information stored in the predetermined region of the register 146 is read by the above-described main control section (not shown). When the numerical information is any of "5", "6", and "7", the state indicated by the numerical information is shown on the display 16M. Thereafter, the image reading operation is stopped.

On the other hand, when the numerical information read from the register 146 is any of "2", "3", and "4", a stand-by state is set until the numerical information becomes "1". When the numerical information is "1", respective image signals of R, G, B, and IR corresponding to image density of a frame image set at the reading position R of the film carrier 90 are obtained by the area CCD 30, and subjected to digital conversion by the A/D converter 32. Thereafter, these signals are transmitted to the image processing section 16.

When the above-described image signals are obtained, among the LED elements 102 provided in the LED light source portion 82, first, an image signal of R is obtained in a state in which only LED elements for emitting light of R are made to emit light, and an image signal of G is obtained in a state in which only LED elements for emitting light of G are made to emit light. Subsequently, an image signal of B is obtained in a state in which only LED elements for emitting light of B are made to emit light, and finally, an image signal of IR is obtained in a state in which only LED elements for emitting light of IR are made to emit light. Thus, in the present embodiment, the image signals are obtained in the order of R, G, B, and IR. However, the order in which the image signals are obtained can be set arbitrarily.

The image processing section 16 stores the received data, as image data, in the image memory 44. In the image processing section 16, correction for eliminating the influence of defects or dust on the photographic film F is made for the image data of R, G, and B based on the image data of IR. Further, image processing is carried out which includes various corrections such as color gradation processing, hypertone processing, and hypersharpness processing, and thereafter, the corrected image data is outputted, as recording image data, to the laser printer section 18.

In the laser printer section 18, laser light modulated in correspondence to the recording image data is applied to the photographic printing paper 62 and an image (latent image) is recorded on the photographic printing paper 62 by scan and exposure. The photographic printing paper 62 on which an image (latent image) is recorded by scan and exposure in the laser printer section 18, is conveyed to the processor section 20, in which processing for color development, bleach-fix, washing, and drying is carried out therefor. As a result, an image is formed on the photographic printing paper 62.

As described above in detail, in the light source portion 80 serving as the light source device according to the present embodiment, the radiating fin 116 which radiates heat of the Peltier element 114 is disposed in contact with the light source housing body 88. Therefore, heat from the LED substrate 100 and the Peltier element 114 can be discharged efficiently. Accordingly, the fan 106 provided for discharging radiated heat, can be made smaller, thereby preventing the device from becoming larger.

In the light source portion 80 according to the present embodiment, when the temperature detected by the thermistor 108 is higher than the target temperature-adjustment value, the fan 106 is controlled so as to operate. Therefore, a heat radiation effect of the radiating fin 116 can be improved and temperature-adjustment control can be carried out with high accuracy.

Further, in the light source portion 80 according to the present embodiment, the LED substrate 100, the Peltier element 114 and the radiating fin 116 are structured integrally by the urging force of the compression spring 126. Accordingly, as compared with a conventional structure in which the LED substrate 100, the Peltier element 114 and the radiating fin 116 are integrated by adhesion, assembling efficiency and maintenability can be substantially improved.

Moreover, in the light source portion 80 according to the present embodiment, when the LED substrate 100, the Peltier element 114 and the radiating fin 116 are formed integrally, the elastic members 114A and 114B are interposed between respective contact surfaces of the LED substrate, Peltier element and radiating fin, so as to reduce force to be applied to urged positions on the contact surfaces between these components to be integrated. As a result, breakage of each component can be prevented and the state in which these components closely contact with one another, can be improved.

Still further, in the light source portion 80 according to the present embodiment, the elastic members 114A and 114B are each formed of materials having high thermal conductivity. Therefore, the thermal conductivity of a heat radiation path between the LED substrate 100, the Peltier element 114 and the radiating fin 116 can be improved. Further, adjustment of the temperature of the LED substrate 100 by the Peltier element 114 and radiation of heat by the radiating fin 116 can be carried out efficiently.

Additionally, in the light source portion 80 according to the present embodiment, a dampproofing effect is obtained, and each dampproofing member is disposed so that the LED elements 102 and the Peltier element 114 are respectively isolated from the outside in such a manner as to be combined with other members. Accordingly, moisture condensation of the LED elements 102 and the Peltier element 114, which are isolated from the outside, can be prevented.

In the area CCD scanner section 14 serving as the image reading apparatus according to the present embodiment, only when the temperature within the apparatus is a predetermined temperature or higher, the control of the Peltier element 114 is performed. Therefore, there is no possibility that the temperature of the LED substrate 100 be rapidly raised by the Peltier element 114, and occurrence of moisture condensation can be prevented.

The present embodiment was described in a case in which the Peltier element 114 is used as the temperature adjusting element of the present invention, but the present invention is not limited to the same. For example, a power transistor may also be applied.

However, in the temperature-adjustment control using a power transistor, the power transistor merely controls so as to increase the temperature, and therefore, it is necessary that the target temperature-adjustment value be set at a value higher than the environmental temperature at the position in which the are CCD scanner section 14 is disposed. However, in this case, temperature-adjustment control can be simply carried out only by on/off control of the power transistor.

Further, the present embodiment was described in a case in which the compression spring 126 is used as the urging section according to the aspects of the present invention, but the present invention is not limited to the same. For example, any member such as blade spring or rubber can be applied so long as it is capable of generating urging force by which the LED substrate 100, the Peltier element 114 and the radiating fin 116 are integrally structured. In this case as well, the same effects as those of the present embodiment can be obtained.

Moreover, the present embodiment was described in a case in which the thermistor 104 provided in the vicinity of the area CCD 30 is used as the device temperature detecting section according to the aspects of the present invention, but the present invention is not limited to the same. For example, a temperature detecting section provided in the vicinity of the laser light sources 52 in the laser printer section 18 for the purpose of temperature-adjustment control for the laser light sources 52 can also be used.

In other words, the device temperature detecting section of the present invention is provided so as to detect the temperature within the area CCD scanner section 14 for the purpose of preventing occurrence of moisture condensation at the time of temperature-adjustment control in the light source portion 80. When the power source of the digital laboratory system 10 is turned on, the temperature within the laser printer section 18 also increases in a manner similar to the temperature within the area CCD scanner section 14. Therefore, it is possible to indirectly detect the temperature within the area CCD scanner section 14 from the temperature detected by the temperature detecting section provided in the vicinity of the laser light sources 52. In this case as well, the same effects as those of the present embodiment can be obtained.

Still further, the present embodiment was described in a case in which only one thermistor 108 is used as the temperature detecting section according to the aspects of the present invention, but the present invention is not limited to the same. For example, temperature-adjustment control may also be carried out based on temperature values obtained by a plurality of thermistors mounted at different positions on the base 112. In this case, temperature-adjustment control can be carried out based on the temperature values at the different positions on the base 112, and therefore, further appropriate temperature-adjustment control can be carried out.

Further, in the foregoing, there was described a case in which the area CCD is used as the image sensor of the present invention, but the present invention is not limited to the same. For example, a linear CCD can also be applied.

Moreover, in the foregoing, these was described a structure which includes LED elements which emit light of IR so as to detect defects or dust on the photographic film F. However, the LED elements which emit light of IR may also be omitted.

Still further, the present embodiment was described in a case in which temperature-adjustment control is effected in a software configuration by executing a temperature-adjustment control program, but the present invention is not limited to the same. A structure may also be applied, wherein temperature-adjustment control is effected in a hardware configuration by using a circuit which is capable of effecting the same control. In this case, as compared with the present embodiment, temperature-adjustment control can be effected at a higher speed.

According to the light source device of the present invention, a radiating member for radiating heat of at least one of a light source and a temperature adjusting element for adjusting the temperature of the light source, is disposed in contact with a device housing body. Therefore, heat from the light source and from the temperature adjusting element can be discharged efficiently. Accordingly, a fan provided for discharging radiation heat can be made smaller, thereby preventing the device from becoming larger.

Further, according to the light source device of the present invention, a light source in which a plurality of light emitting elements are arranged on a substrate in a two-dimensional manner, a temperature adjusting element for adjusting the temperature of the light source by carrying out at least one of heat absorption and heat radiation, and a radiating member for radiating heat of at least one of the light source and the temperature adjusting element, are formed integrally by urging force of urging section. Accordingly, as compared with a conventional structure in which the light source, the temperature adjusting element, and the radiating member are integrated by adhesion, assembling efficiency and maintenability can be substantially improved.

Moreover, according to the image reading method and apparatus of the present invention, only when the temperature within the apparatus becomes a predetermined value or higher, the temperature adjusting element is provided so as to control the temperature. Accordingly, there is no possibility that the temperature of the light source is rapidly raised by the temperature adjusting element, and occurrence of moisture condensation can be prevented.

What is claimed is:

1. A light source device comprising:
    a light source including a plurality of light emitting elements arranged on a substrate;
    a temperature detecting section for detecting a temperature of the light source;
    a temperature adjusting element for adjusting the temperature of the light source by effecting at least one of heat absorption and heat radiation;
    a heat radiating fin for radiating heat of at least one of the light source and the temperature adjusting element, the heat radiating fin being disposed in direct contact with a housing body of the device;
    an urging section for integrally forming the light source, the temperature adjusting element, and the heat radiation fin by urging force thereof; and
    a control section for controlling the temperature adjusting element so that a temperature detected by the temperature detecting section becomes a predetermined temperature which is set to be higher than an environmental temperature at a position in which the light source device is disposed.

2. A light source device according to claim 1, further comprising:
    elastic members interposed between respective contact surfaces of the light source, the temperature adjusting element and the heat radiating fin which are formed integrally.

3. A light source device according to claim 2, wherein the elastic members are each formed to include material having a high thermal conductivity.

4. A light source device according to claim 1, further comprising a fan for cooling the heat radiating fin,
   wherein when the temperature detected by the temperature detecting section is higher than the predetermined temperature, the control section controls to operate the fan.

5. A light source device according to claim 1, further comprising a dampproofing member having a dampproofing effect and disposed so that at least one of a group consisting the plurality of light emission elements and the temperature adjusting element is isolated from the outside.

6. A light source device according to claim 1, wherein the heat radiating fin is disposed in contact with and exposed outside of the housing body of the device.

7. A light source device according to claim 1, wherein the housing body has an opening, and a light source section comprising the light source, the temperature detecting section, the temperature adjusting element and the heat radiating fin is provided at the opening such that the heat radiating fin contacts with the housing body.

8. An image reading apparatus for reading an image on an original, comprising:
   a light source device including
      a light source for emitting light,
      a temperature detecting section for detecting a temperature of the light source,
      a temperature adjusting element for adjusting the temperature of the light source by effecting at least one of heat absorption and heat radiation,
      a heat radiating member for radiating heat of at least one of the light source and the temperature adjusting element, the heat radiating member being disposed in direct contact with a housing body of the device, and
      a control section for controlling the temperature adjusting element so that a temperature detected by the temperature detecting section becomes a predetermined temperature;
   an image sensor for receiving light emitted from the light source device and reflected by or transmitted through the original, thereby reading an image on the original; and
   a device temperature detecting section for detecting a temperature at a position within the image reading apparatus and outside the light source device,
   wherein only when the temperature detected by the device temperature detecting section becomes a prefixed temperature or higher, the control section of the light source device controls the temperature adjusting element.

9. An image reading apparatus according to claim 8, wherein the predetermined temperature is set so as to be higher than an environmental temperature at a position in which the light source device is disposed.

10. An image reading apparatus according to claim 8, wherein the device temperature detecting section is provided in a vicinity of said image sensor.

11. An image reading apparatus according to claim 8, wherein the housing body has an opening, and a light source section comprising the light source, the temperature detecting section, the temperature adjusting element and the heat radiating member is provided at the opening such that the heat radiating fin contacts with the housing body.

12. An image reading apparatus for reading an image on an original, comprising:
   a light source device including
      a light source including a plurality of light emitting elements arranged on a substrate,
      a temperature detecting section for detecting a temperature of the light source,
      a temperature adjusting element for adjusting the temperature of the light source by effecting at least one of heat absorption and heat radiation,
      a heat radiating member for radiating heat of at least one of the light source and the temperature adjusting element, the heat radiating member being disposed in direct contact with a housing body of the device,
      an urging section for integrally forming the light source, the temperature adjusting element, and the heat radiation member by urging force thereof, and
      a control section for controlling the temperature adjusting element so that a temperature detected by the temperature detecting section becomes a predetermined temperature;
   an image sensor for receiving light emitted from the light source device and reflected by or transmitted through the original, thereby reading an image on the original; and
   a device temperature detecting section for detecting a temperature at a position within the image reading apparatus and outside the light source device,
   wherein only when the temperature detected by the device temperature detecting section becomes a prefixed temperature or higher, the control section of the light source device controls the temperature adjusting element.

13. An image reading apparatus according to claim 12, wherein the predetermined temperature is set to be higher than an environmental temperature at a position in which the light source device is disposed.

14. An image reading apparatus according to claim 12, wherein the device temperature detecting section is provided in a vicinity of said image sensor.

15. An image reading apparatus according to claim 12, wherein the housing body has an opening, and a light source section comprising the light source, the temperature detecting section, the temperature adjusting element and the heat radiating member is provided at the opening such that the heat radiating fin contacts with the housing body.

16. An image reading method by use of an image reading apparatus for reading an image on an original, in which the image reading apparatus comprises a light source device and a device temperature detecting section for detecting a temperature at a position within the image reading apparatus and outside the light source device, said device temperature detecting section being provided separate from said light source device, said light source device including
   a light source for emitting light;
   a temperature detecting section for detecting a temperature of the light source;
   a temperature adjusting element for adjusting the temperature of the light source by effecting at least one of heat absorption and heat radiation;
   a heat radiating member for radiating heat of at least one of the light source and the temperature adjusting element, the heat radiating member being disposed in direct contact with a housing body of the device; and
   a control section for controlling the temperature adjusting element so that a temperature detected by the temperature detecting section becomes a predetermined temperature,
   the method comprising controlling the temperature adjusting element by the control section of the light source device only when the temperature detected by the device temperature detecting section becomes a prefixed temperature or higher.

17. The image reading method according to claim 16, wherein the housing body has an opening, and a light source section comprising the light source, the temperature detecting section, the temperature adjusting element and the heat radiating member is provided at the opening such that the heat radiating fin contacts with the housing body.

18. The image reading method according to claim 16, wherein the device temperature detecting section is provided in a vicinity of said image sensor.

19. The image reading method according to claim 16, wherein the prefixed temperature is set so as to be higher than an environmental temperature at a position in which the light source device is disposed.

20. An image reading method by use of an image reading apparatus for reading an image on an original, in which the image reading apparatus comprises a light source device and a device temperature detecting section for detecting a temperature at a position within the image reading apparatus and outside the light source device, said device temperature detecting section being provided separate from said light source device, said light source device including a light source including a plurality of light emitting elements arranged on a substrate;

a temperature detecting section for detecting a temperature of the light source;

a temperature adjusting element for adjusting the temperature of the light source by effecting at least one of heat absorption and heat radiation;

a heat radiating member for radiating heat of at least one of the light source and the temperature adjusting element, the heat radiating member being disposed in direct contact with a housing body of the device;

an urging section for integrally forming the light source, the temperature adjusting element, and the heat radiation member by urging force thereof; and a control section for controlling the temperature adjusting element so that a temperature detected by the temperature detecting section becomes a predetermined temperature, the method comprising controlling the temperature adjusting element by the control section of the light source device only when the temperature detected by the device temperature detecting section becomes a prefixed temperature or higher.

21. The image reading method according to claim 20, wherein the housing body has an opening, and a light source section comprising the light source, the temperature detecting section, the temperature adjusting element and the heat radiating member is provided at the opening such that the heat radiating fin contacts with the housing body.

22. The image reading method according to claim 20, wherein the device temperature detecting section is provided in a vicinity of said image sensor.

23. The image reading method according to claim 20, wherein the prefixed temperature is set so as to be higher than an environmental temperature at a position in which the light source device is disposed.

24. A light source comprising:

a light source emitting section comprising:

a light source for emitting light, a temperature detecting section for detecting a temperature of the light source, a temperature element for adjusting the temperature of the light source by effecting at least one of heat absorption and heat radiation, and a heat radiating member for radiating heat of at least one of the light source and the temperature adjusting element;

a housing body having an opening, the heat radiating member being disposed in contact with the housing body; and a control section for controlling the temperature adjusting element so that a temperature detected by the temperature detecting section becomes a predetermined temperature, wherein the light source, the temperature adjusting element and the heat radiating member are combined integrally by an urging member to form the light source section, and the light source section is attached at the opening of the housing body by an attaching member.

25. A light source device according to claim 24, wherein a light emitting opening, from which the light is emitted, is formed in the housing body, the light emitting opening is positioned at a light emitting side of the housing body, and the opening at which the light source section is attached is positioned at a side of the housing body opposite to the light emitting side.

* * * * *